US 8,626,724 B2

(12) United States Patent
Hornibrook et al.

(10) Patent No.: US 8,626,724 B2
(45) Date of Patent: Jan. 7, 2014

(54) METHOD FOR AUTOMATED DESIGN OF ROW COMPRESSION ON TABLES IN A RELATIONAL DATABASE

(75) Inventors: John Hornibrook, Markham (CA);
Laurent S. Mignet, New Delhi (IN);
William R. Minor, Markham (CA);
Sumit Negi, New Delhi (IN); Daniele C. Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 12/021,330

(22) Filed: Jan. 29, 2008

(65) Prior Publication Data

US 2009/0193041 A1 Jul. 30, 2009

(51) Int. Cl.
*G06F 7/00* (2006.01)

(52) U.S. Cl.
USPC .......................................... 707/693

(58) Field of Classification Search
USPC .......................................... 707/693
See application file for complete search history.

(56) References Cited

U.S. PATENT DOCUMENTS

| | | | | |
|---|---|---|---|---|
| 5,534,861 A * | 7/1996 | Chang et al. | ...................... | 341/79 |
| 5,918,225 A * | 6/1999 | White et al. | .......................... | 1/1 |
| 6,292,894 B1 * | 9/2001 | Chipman et al. | .............. | 713/168 |
| 6,321,218 B1 * | 11/2001 | Guay et al. | ............................. | 1/1 |
| 7,154,416 B1 * | 12/2006 | Savage | ............................. | 341/51 |
| 7,171,427 B2 * | 1/2007 | Witkowski et al. | ................... | 1/1 |
| 7,246,111 B1 * | 7/2007 | Chaware et al. | ....................... | 1/1 |
| 7,370,043 B1 * | 5/2008 | Shelton et al. | ......................... | 1/1 |
| 7,467,145 B1 * | 12/2008 | Castellanos et al. | .................. | 1/1 |
| 2003/0093408 A1 * | 5/2003 | Brown et al. | ...................... | 707/2 |
| 2005/0132161 A1 * | 6/2005 | Makela et al. | ................. | 711/170 |
| 2005/0234927 A1 | 10/2005 | Bande et al. | | |
| 2006/0184338 A1 * | 8/2006 | Lightstone et al. | ........... | 702/182 |
| 2007/0112549 A1 * | 5/2007 | Lau et al. | ........................ | 703/13 |
| 2008/0040348 A1 * | 2/2008 | Lawande et al. | ................... | 707/7 |
| 2009/0043792 A1 * | 2/2009 | Barsness et al. | .............. | 707/101 |

OTHER PUBLICATIONS

Table Compression in Oracle9i. Release2. An Oracle White Paper, May 2002.*
Daniel C. Zilio, Jun Rao, Sam Lightstone, Guy Lohman, Adam Storm, Christian Garcia-Arellano, Scott Fadden, DB2 design advisor: integrated automatic physical database design, Proceedings of the Thirtieth international conference on Very large data bases, p. 1087-1097, Aug. 31-Sep. 3, 2004, Toronto, Canada.*
Balakrishna R. Iyer, David Wilhite, Data Compression Support in Databases, Proceedings of the 20th International Conference on Very Large Data Bases, p. 695-704, Sep. 12-15, 1994.*
Goetz Graefe, Leonard D. Shapiro. Data Compression and Database Performance. In Proceedings of the Symposium on Applied Computing, 1991.*

(Continued)

*Primary Examiner* — Robert Timblin
(74) *Attorney, Agent, or Firm* — Ryan, Mason & Lewis, LLP

(57) ABSTRACT

A workload specification is obtained for the database. Based on the workload specification, candidate ones of the tables are identified and ranked. Compression impact is evaluated for the candidate ones of the tables. A design for the database is developed, specifying at least one of: (i) which of the tables should be compressed, and (ii) which of the tables should not be compressed.

20 Claims, 3 Drawing Sheets

(56) References Cited

OTHER PUBLICATIONS

Compression Analysis Procedure Written by Glen Blood (Revised on Apr. 6, 2004). http://web.archive.org/web/20040713090159/http://www.teradataforum.com/I040410a.htm.*

Meikel Poess, Dmitry Potapov, Data compression in Oracle, Proceedings of the 29th international conference on Very large data bases, p. 937-947, Sep. 9-12, 2003, Berlin, Germany.*

Graefe, G.; Shapiro, L.D., "Data compression and database performance," Applied Computing, 1991., [Proceedings of the 1991] Symposium on, vol., No., pp. 22,27, Apr. 3-5, 1991 doi: 10.1109/SOAC.1991.143840.*

Table Compression in Oracle Database 10g Release 2. An Oracle White Paper May 2005.*

Hu Tian-lei et al, "Automatic relational database compression scheme design based on swarm evolution", Dec. 11, 2005; www zju.edu cn/jzus; www springerlink com.

Timos K Sellis, "Multiple-Query Optimization"; ACM Transactions on Database Systems, vol. 13, No. 1, Mar. 1988, pp. 23-52.

Victor Chang, et al, "Row Compression in DB2 9: Analysis of a DSS Database Environment", Oct. 2006.

"Oracle Backup and Recovery"; Jan. 28, 2008 http://www oracle com/technology/deploy/availability/htdocs/BR_Overview htm?_template=/ocom/pr.

"IBM DB2 Database for Linux, Unix, and Windows Information Center", Jan. 17, 2008 http://publib boulder ibm com/infocenter/db21uw/v9/topic/com.ibm db2 udb doe/welcome htm.

"Introducing DB2 9, Part 1: Data Compression in DB2"; Ray Ahuja, May 24, 2006; http://www ibm com/developerworks/db2/library/techarticle/dm-0605ahuja/.

* cited by examiner

FIG. 1
PRIOR ART

EXAMPLE ROWS

| | NAME | DEPT | SALARY | CITY | STATE | ZIP CODE |
|---|---|---|---|---|---|---|
| 102 | FRED | 500 | 10000 | PLANO | TX | 24355 |
| 104 | JOHN | 500 | 20000 | PLANO | TX | 24355 |

FIG. 2
PRIOR ART

COMPARISON OF UNCOMPRESSED AND COMPRESSED DATA STORAGE

UNCOMPRESSED

202 — | FRED | 500 | 10000 | PLANO | TX | 24355 | JOHN | 500 | 20000 | PLANO | TX | 24355 |

COMPRESSED

204 — | FRED | (01) | 10000 | (02) | JOHN | (01) | 20000 | (02) | ... |

206:
| 01 | DEPT 500 |
| 02 | PLANO, TX 24355 |
| ... | ... |

METHOD FOR AUTOMATED DESIGN OF ROW COMPRESSION ON TABLES IN A RELATIONAL DATABASE

CROSS-REFERENCE TO RELATED APPLICATION(S)

The present application is related to a commonly assigned U.S. application Ser. No. 12/021,365 entitled "System and Computer Program Product for Automated Design of Row Compression on Tables in a Relational Database,", and filed on even date herewith, the disclosure of which is incorporated by reference herein in its entirety.

FIELD OF THE INVENTION

The present invention relates to the electrical, electronic and computer arts, and, more particularly, to relational databases and the like.

BACKGROUND OF THE INVENTION

Row compression is an interesting feature that was introduced in IBM DB2® brand computer software version 9 (registered mark of International Business Machines Corporation, Armonk, N.Y., USA) ("IBM"). To summarize, DB2® software creates a dictionary of values for each compressed table, and compresses each row, replacing the value by a mapped value in the dictionary. The result is a huge saving, in terms of disk storage requirements, and therefore in total cost of operations/ownership. The IBM DB2 Database for Linux, UNIX, and Windows Information Center, http://publib.boulder.ibm.com/infocenter/db2luw/v9/indexjsp, expressly incorporated herein by reference in its entirety for all purposes, describes row compression. FIG. 1 shows example rows 100. Row 102 lists the name, department, salary, city, state, and postal "zip" code for employee "Fred," while row 104 lists similar information for employee "John." FIG. 2 shows uncompressed data storage at 202 and compressed data storage at 204. A dictionary is shown at 206. "Dept 500" is replaced by mapped value 01 while "Plano, Tex. 24355" is replaced by mapped value 02.

As a row needs to be uncompressed before being used by the internal query processor, additional central processing unit (CPU) cost is required to perform any queries on the compressed table. In "Row Compression in DB2 9: Analysis on DSS and OLTP Database Environments," Y. H Lee, N. Bissoon, and V. Chang, July 2006, available at http://www3.software.ibm.com/ibmdl/pub/software/dw/dm/db2/dm-0610chang/Row_Compression.pdf, expressly incorporated herein by reference in its entirety for all purposes, the authors present comparative results of decision support system (DSS) and on-line transaction processing (OLTP) workload on an uncompressed and compressed database, using standard metrics. Their analysis concludes that even though some queries of the workload show an improvement in execution time (in the compressed case over the uncompressed case), there are other queries for which the execution time increases. This effect is more pronounced in the case of DSS workloads. Therefore, even though the gain in terms of storage saving is clear, the overall performance of a workload in a database using row compression has to be analyzed carefully.

As with most of the major database manager software packages, DB2® software has a value compression mechanism. Value compression provides an alternate method of representing the internal storage format of a data row. The disk storage savings depends on the table column definition. In this situation, NULLs and zero-length data that have been assigned to defined variable-length data types (VARCHAR, VARGRAPHICS, LONG VARCHAR, LONG VARGRAPHIC, BLOB, CLOB, and DBCLOB) will not be stored on disk. Row compression is different from value compression. Row compression does not depend on the table column definition. It replaces common byte patterns in a data row with shorter symbol strings. The storage savings are greater than the savings provided with value compression. DB2® universal data base (UDB) software implements row compression.

SUMMARY OF THE INVENTION

Principles of the present invention provide techniques for an automated design of row compression on tables in a relational database. In one aspect, an exemplary method (which can be computer implemented) for such compression includes the steps of obtaining a workload specification for the database; based on the workload specification, identifying and ranking candidate ones of the tables; evaluating compression impact for the candidate ones of the tables; and developing a design for the database, specifying at least one of: (i) which of the tables should be compressed, and (ii) which of the tables should not be compressed.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system/apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 1 shows exemplary rows in a database, as known in the prior art;

FIG. 2 presents a comparison of compressed and uncompressed data storage, as known from the prior art;

DETAILED DESCRIPTION OF PREFERRED EMBODIMENTS

One or more embodiments of the invention provide a method and system/apparatus that helps the data base administrator (DBA) determine which tables in the database should be row compressed in order to gain desirable, and preferably maximum, improvements in the overall workload query execution time. The recommended configurations will suggest which tables in the database should be row compressed.

Disk storage systems can often be the most expensive components of a database solution. For large warehouses or databases with huge volumes of data, the cost of the storage subsystem can easily exceed the combined cost of the hardware server and the data server software. The existing approach (herein referred to as the baseline case) is to compress all the tables in the database to gain maximum benefit in terms of disk space usage. This choice (of compressing all the tables) can be sub optimum from the overall workload execution point of view. When considering the use of row compression, it is important to take the CPU and disk input/output (I/O) utilization of the system into account. Since there is additional overhead when compressing and expanding rows in the tables, it is to be expected that row compression will require more CPU resources.

One or more inventive embodiments help the DBA to systematically explore which set of tables should be subjected to compression by factoring in both these concerns, namely, disk space savings, and the effect of compression on overall workload execution time.

Figure 3:
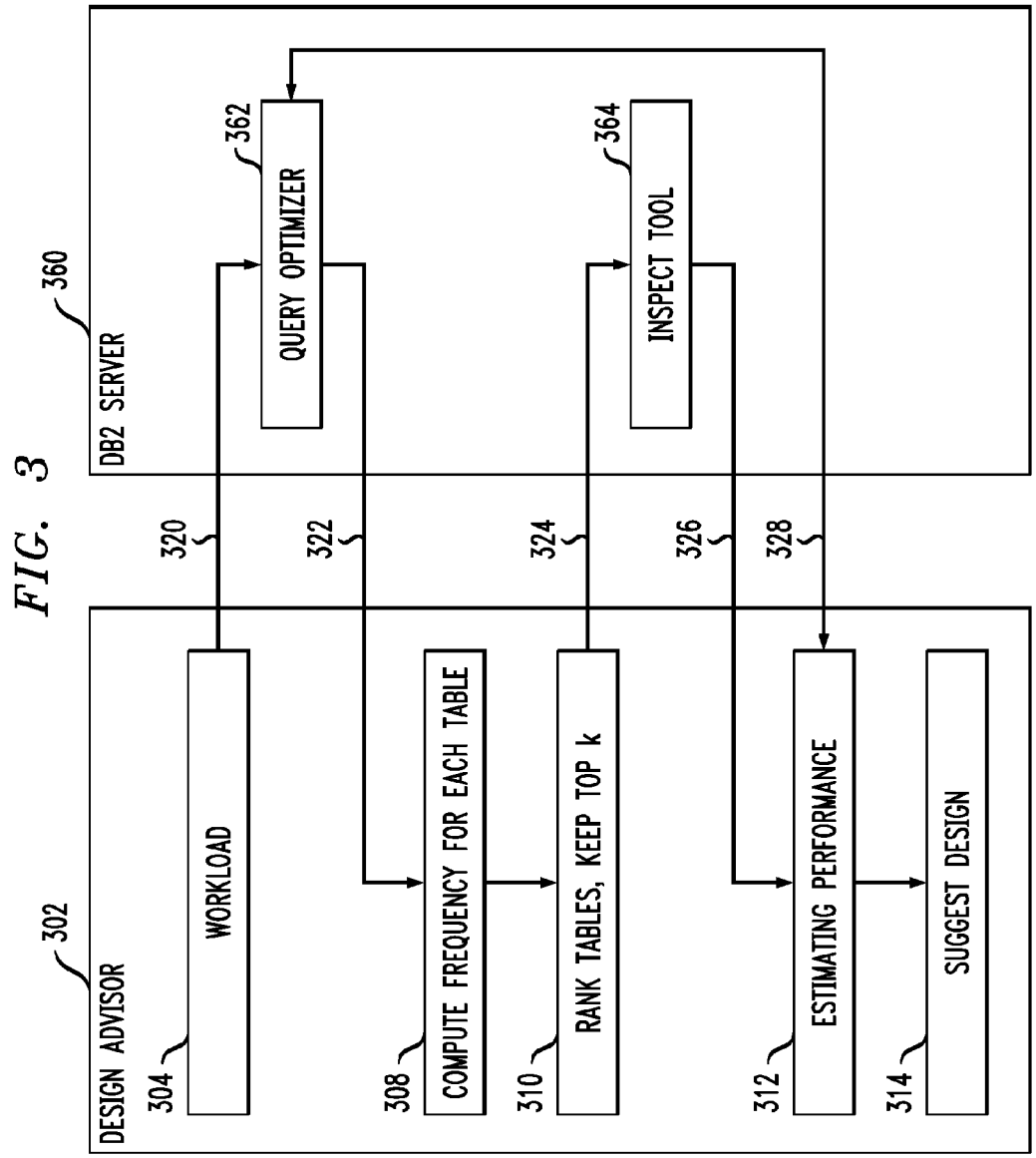
FIG. 3 shows an exemplary block and data flow diagram, according to an aspect of the invention.

One exemplary apparatus implements an exemplary method using several inputs from the database manager. One exemplary implementation of an inventive apparatus can be realized inside database design advisor software, such as DB2® Design Advisor software 302, as depicted in FIG. 3 (DB2® Design Advisor software is a non-limiting example). In one or more embodiments, one input is a workload specification, detailing specific queries and the frequency of execution of each, as shown at 304. An output includes a set of tables to compress, the compression of which may result in speeding-up the processing of the workload given in the input. The output may be in the form of a design (which may be said to be suggested by the design advisor), as shown at 314.

By way of example and not limitation, different embodiments can employ the following two scenarios. Depending under which scenario the method is used, the output will be different.

Scenario A:

In this setting, the DBA has set all tables in the database for compression. When run in this setting, an exemplary embodiment of the method, for a given workload, recommends which tables should not be compressed, considering the adverse effect compression (due to CPU overhead) will have on the overall workload execution time. The method also outputs the gains forgone, in terms of disk space savings, if the recommendation from the advisor is adopted. In essence, in this approach, I/O and CPU costs are modeled for candidates with respect to the base line case, that is, the case where all tables are selected for compression (as used herein, including the claims, CPU costs refer to time expended in processing).

Scenario B:

In this case, no tables are set for compression. When run in this setting, an exemplary embodiment of the method, for a given workload, recommends which tables should be compressed, to minimize the overall penalty incurred in terms of CPU overheads (due to compression) and to maximize I/O utilization. The I/O and CPU cost are modeled by simulating the compression of one table at a time and checking if the result is the one expected to meet the input criteria.

Note that "minimizing," "maximizing," and so on are within the context of one or more exemplary embodiments, and in general terms, one or more embodiments of the invention can be used to enhance performance without necessarily achieving minima or maxima of certain criteria.

In addition to design advisor 302, FIG. 3 depicts "DB2 server" 360, it being understood that the server could run other database programs besides the DB2® program. Server 360 may in one embodiment include a query optimizer module 362. Data flows between advisor 302 and optimizer 362 are indicated by arrows 320, 322. Data flows between advisor 302 and inspect tool 364 are indicated by arrows 324, 326.

One or more embodiments of the invention provide a model for (i) detecting candidate tables that should not be compressed, and (ii) estimating the workload benefit and storage benefit forgone for the given candidates.

As indicated by arrow 320, under Scenario A, queries from the workload obtained in step 304 are fed to a MQO (Multiple Query Optimization) routine 362 that extracts frequent sub-expressions from queries in the workload. In the MQO technique, the QGM (Query Graph Model) is traversed bottom up. Common and/or similar sub expressions are identified. If required, expressions are generalized; and compensation can be performed, if data needs to be adjusted—for example, back-joins and/or predicate adjustment. In one or more instances, pertinent rules for the MQO technique are as follows: base table boxes refer to the same data sources, and expressions must be derivable from generalized expressions. The skilled artisan is familiar with MQO per se, from, for example, the reference: T. Sellis, "Multiple Query Optimization", ACM Trans. on Database Systems, 13(1), March 1988, and, given the teachings herein, can employ MQO in connection with one or more embodiments of the invention.

Referring again to data flow arrow 320, under Scenario B, queries from the workload are run in a mode such as the "DB2 Explain" mode. In this mode, detailed access plans and optimizer estimates are generated for individual queries, in step 362. These access plans are used to find the most frequently accessed tables, the number of rows read, and the associated I/O & CPU costs.

In step 308, tables extracted from the workload (indicated by arrow 322) are sorted on "frequency of occurrence in workload" and I/O-CPU costs. Tables that are part of the top-n sub-expressions are candidates for "no-compression." Tables that are accessed as part of queries with UPDATE, INSERT or DELETE statements are weighted and/or penalized (W) more:

$$R_J = Freq(T_J) * W * \text{Function}(I/O, CPU) \quad (1)$$

The skilled artisan will appreciate that Function (I/O, CPU) utilizes catalog simulation to model the gains obtained by compressing a particular set of tables.

In step 310, choose the top-k tables, based on the frequency computed in step 308. Each recommendation is a possible configuration, as illustrated in the example below. Consider an example of a "Top-3 List":

$R_A = (A, B) \Rightarrow$ compress all tables except A and B
$R_B = (B, Z) \Rightarrow$ compress all tables except B and Z
$R_C = (A, Z, P) \Rightarrow$ compress all tables except A, Z and P By employing catalog simulation, it is possible to estimate the performance benefits that can be realized by each of the above configurations over the baseline case (baseline case: all tables of the database are set for compression). In this setting, each query in the workload is re-optimized in a special mode, whereby the structured query language (SQL) optimizer 312 simulates the effect of compression on all candidates, thus providing a cost estimate (total execution time) for the workload, as indicated at arrow 326.

With reference to arrow 324, the DB2® program provides the INSPECT tool (step 364) in order to help one determine the compression ratio estimate for a particular table or data set. Of course, other, similar tools can also be employed. Using the tool, calculate the storage space gain if all tables of the database are compressed, that is, for the baseline case. By using available tools, compute the different statistics and compression ratio for the tables that were selected in step 310. One non-limiting example of such a tool is given below, to estimate the compression ratio of one table: "db2 inspect rowcompestimate table name <table name> results keep <filename>"

Turning now to data flow arrow 326, insert the statistics generated in step 364 to the catalog tables, and measure the performance improvements for each configuration individually, as indicated by arrow 328.

Exemplary output from the preceding technique follows:
//Baseline Case
$S_{Base}$=( )→compress all tables→
   Estimated Disk Space Saving=X %
   Total Execution time=Y secs
$S_{RL}$=(A, B)=>compress all tables except A and B
   Estimated Disk Space Saving=X % minus %[disk space saving gained from compressing A and B]
   Total Execution time=A % improvement over baseline Case
$S_{RM}$=(B, Z)=>compress all tables except B and Z→
   Estimated Disk Space Saving=X % minus %[disk space saving gained from compressing B and Z]
   Total Execution time=B % improvement over baseline Case
$S_{RP}$=(A, Z, P)=>compress all tables except A, Z and P→
   Estimated Disk Space Saving=X % minus %[disk space saving gained from compressing A, Z and P]
   Total Execution time=C % improvement over baseline Case In this particular example, the total execution time for each set other than the baseline assumes a given percentage improvement over the baseline case. It should be noted that in some instances, there could be a degradation compared to the baseline case; that is, in some situations, it may be optimal to compress all tables.

An exemplary method is now disclosed to pick the tables to compress from the list of candidate uncompressed tables described above, in particular, with regard to Scenario A. Given the teachings herein, the skilled artisan can readily derive a method for Scenario B, using the same principles.

Once the set of candidate tables are collected in step 310, further pruning of this list can be undertaken by considering only the top nth tables. Consider the first table of the list and simulate the workload on a catalog on which the chosen table is compressed. Store the overall workload cost as well as the estimated storage gain. If the workload cost is lower than the cost computed on the previous step, mark this table as "compressible"; otherwise, skip it. Then, re-compute the list of candidate tables as in Scenario A, and repeat the same process until no gains are obtained or the list of tables' candidate has been exhausted.

One or more embodiments of the invention can be implemented within a design advisor 302, such as the IBM DB2® Design Advisor software tool. The aforementioned IBM DB2® UDB has a design advisor feature that allows a user to automatically make physical database design decisions, such as which indexes, materialized views, clustering or partitioning should exist on the database. There are many more design choices that exist for physical database design, and design advisor programs may be extended to add these other decisions. One such feature is the selection of which tables to compress. Thus, one or more embodiments of the invention serve as a description of the compression selection, which could be added to a design advisor program.

Following appropriate steps of the design advisor, first, one or more embodiments of the invention collect the different tables involved in the workload by using the query optimizer, as shown at blocks 304, arrow 320, block 362, and arrow 322. Then, using, for example, one of the methods described above, iterate on the set of solutions by involving the query optimizer 362 to estimate the cost of the workload for each solution, as indicated by block 312, arrow 328, and block 362. Finally, by comparing the different solutions, the design advisor 302 proposes a new design, as at block 314, by enumerating a set of tables which, if compressed, will meet the constraint(s) that were input, such as workload speed-up or space gain.

Thus, it will be appreciated that one or more embodiments of the invention provide a method and system/apparatus to recommend which tables of a database should be compressed under the following constraints: (i) a given schema, and (ii) a given workload. In some instances, the method and apparatus accept, in input, a given performance percentage that the user is willing to pay or to expect when compression is applied, and/or a storage capacity that the new configuration should comply with (or, stated differently, conform to). In addition to, or in lieu of, such constraints, other input constraints can also be applied. Thus, one or more inventive embodiments recommend which tables of a database should be compressed, given a workload and a set of constraint(s) (in some instances, the set of constraints can also be empty). It should be noted that, as used herein, including the claims, "compression impact" is intended to refer to both (i) the impact that would occur from not compressing a given table, in the case where compression is initially assumed for all tables, and (ii) the impact that would occur from compressing a given table, in the case where it is initially assumed that all tables are not compressed.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 4:
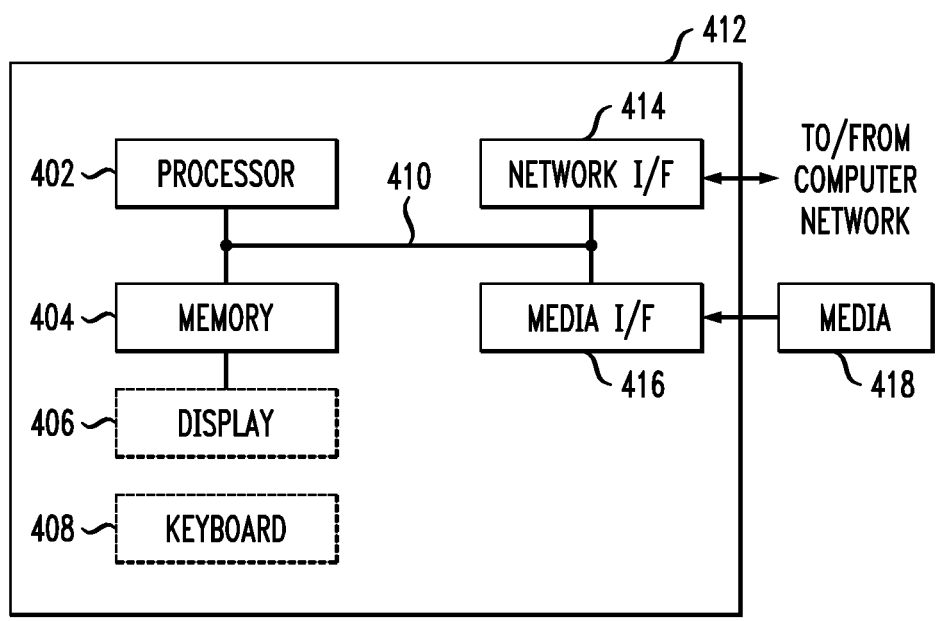
FIG. 4 depicts a computer system that may be useful in implementing one or more aspects and/or elements of the present invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 404), magnetic tape, a removable computer diskette (for example media 418), a random access memory (RAM), a read-only memory (ROM), a rigid magnetic disk and an optical disk. Current examples of optical disks include compact disk-read only memory (CD-ROM), compact disk-read/write (CD-R/W) and DVD.

A system, preferably a data processing system, suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for recommending row compression on tables in a relational database, said method comprising the steps of:
    obtaining a workload specification for said database;
    based on said workload specification, identifying and ranking candidate ones of said tables;
    evaluating a compression impact on a workload execution time for each of said candidate ones of said tables, wherein said evaluating comprises, for each of said candidate ones of said tables:
        simulating the workload specification on said database under a configuration wherein a first table of said candidate ones of said tables is compressed and each other table of said candidate ones of said tables is not compressed;
        determining an estimated workload execution time based on said simulating;
        comparing said estimated workload execution time to a baseline workload execution time under a configuration wherein each of said candidate ones of said tables is not compressed; and
        identifying the first table as a table that should be compressed if the estimated execution time is an improvement over the baseline workload execution time; and
    developing a design for said database, specifying one of: (i) which of said tables should be compressed based on said evaluation, and (ii) which of said tables should not be compressed based on said evaluation.

2. The method of claim 1, further comprising obtaining a specification of a given performance penalty a user is willing to accept when compression is applied to given ones of said tables.

3. The method of claim 2, wherein said developing step is based, at least in part, on compliance with said workload specification.

4. The method of claim 3, wherein said workload specification is expressed as a percentage value comparing performance with said compression to performance without said compression.

5. The method of claim 1, further comprising obtaining a storage capacity which said design must comply with, wherein said developing step is based, at least in part, on compliance with said storage capacity.

6. The method of claim 1, further comprising:
    obtaining a specification of a given performance penalty a user is willing to accept when compression is applied to given ones of said tables; and
    obtaining a storage capacity which said design must comply with;
    wherein said developing step is based, at least in part, on compliance with said specification and compliance with said storage capacity.

7. The method of claim 1, wherein:
said workload comprises queries; and
said identifying and ranking step in turn comprises:
- feeding said queries to a query optimization routine which extracts frequent sub-expressions therefrom; and
- sorting said tables based at least on frequency of occurrence in said workload and input-output and central processing unit costs.

8. The method of claim 1, wherein:
said workload comprises queries; and
said identifying and ranking step in turn comprises:
- running said queries in an explain mode to obtain detailed access plans and optimizer estimates for individual ones of said queries; and
- sorting said tables based at least on frequency of occurrence in said workload and input-output and central processing unit costs.

9. A computer program product comprising a computer readable recordable storage apparatus including computer usable program code for recommending row compression on tables in a relational database, said computer program product including:
- computer usable program code for obtaining a workload specification for said database;
- computer usable program code for, based on said workload specification, identifying and ranking candidate ones of said tables;
- computer usable program code for evaluating a compression impact on a workload execution time for each of said candidate ones of said tables, wherein said evaluating comprises, for each of said candidate ones of said tables:
  - simulating the workload specification on said database under a configuration wherein a first table of said candidate ones of said tables is compressed and each other table of said candidate ones of said tables is not compressed;
  - determining an estimated workload execution time based on said simulating;
  - comparing said estimated workload execution time to a baseline workload execution time under a configuration wherein each of said candidate ones of said tables is not compressed; and
  - identifying the first table as a table that should be compressed if the estimated execution time is an improvement over the baseline workload execution time; and
- computer usable program code for developing a design for said database, specifying one of: (i) which of said tables should be compressed based on said evaluation, and (ii) which of said tables should not be compressed based on said evaluation.

10. The computer program product of claim 9, further comprising computer usable program code for obtaining a specification of a given performance penalty a user is willing to accept when compression is applied to given ones of said tables.

11. The computer program product of claim 10, wherein said computer usable program code for developing bases said design, at least in part, on compliance with said workload specification.

12. The computer program product of claim 11, wherein said workload specification is expressed as a percentage value comparing performance with said compression to performance without said compression.

13. The computer program product of claim 9, further comprising:
- computer usable program code for obtaining a specification of a given performance penalty a user is willing to accept when compression is applied to given ones of said tables; and
- computer usable program code for obtaining a storage capacity which said design must comply with;
- wherein said computer usable program code for developing bases said design, at least in part, on compliance with said specification and compliance with said storage capacity.

14. A system for recommending row compression on tables in a relational database, said system comprising:
- a memory; and
- at least one processor, coupled to said memory, and operative to:
  - obtain a workload specification for said database;
  - based on said workload specification, identify and rank candidate ones of said tables;
  - evaluate a compression impact on a workload execution time for each of said candidate ones of said tables, wherein said evaluating comprises, for each of said candidate ones of said tables:
    - simulating the workload specification on said database under a configuration wherein a first table of said candidate ones of said tables is compressed and each other table of said candidate ones of said tables is not compressed;
    - determining an estimated workload execution time based on said simulating;
    - comparing said estimated workload execution time to a baseline workload execution time under a configuration wherein each of said candidate ones of said tables is not compressed; and
    - identifying the first table as a table that should be compressed if the estimated execution time is an improvement over the baseline workload execution time; and
  - develop a design for said database, specifying one of: (i) which of said tables should be compressed based on said evaluation, and (ii) which of said tables should not be compressed based on said evaluation.

15. The system of claim 14, wherein said processor is further operative to obtain a specification of a given performance penalty a user is willing to accept when compression is applied to given ones of said tables.

16. The system of claim 15, wherein said processor is operative to develop said design based, at least in part, on compliance with said workload specification.

17. The system of claim 16, wherein said workload specification is expressed as a percentage value comparing performance with said compression to performance without said compression.

18. The system of claim 14, wherein said processor is further operative to:
- obtain a specification of a given performance penalty a user is willing to accept when compression is applied to given ones of said tables; and
- obtain a storage capacity which said design must comply with;
- wherein said processor is operative to develop said design based, at least in part, on compliance with said specification and compliance with said storage capacity.

19. The method of claim 1, wherein said evaluating further comprises, for each of said candidate ones of said tables:
- simulating the workload specification on said database under a configuration wherein a first table of said candidate ones of said tables is not compressed and each other table of said candidate ones of said tables is compressed;

determining an estimated workload execution time based on said simulating;

comparing said estimated workload execution time to a baseline workload execution time under a configuration wherein each of said candidate ones of said tables is compressed; and identifying the first table as a table that should be compressed if the estimated execution time is an improvement over the baseline workload execution time.

20. The system of claim 14, wherein said evaluating further comprises, for each of said candidate ones of said tables:

simulating the workload specification on said database under a configuration wherein a first table of said candidate ones of said tables is not compressed and each other table of said candidate ones of said tables is compressed;

determining an estimated workload execution time based on said simulating;

comparing said estimated workload execution time to a baseline workload execution time under a configuration wherein each of said candidate ones of said tables is compressed; and identifying the first table as a table that should be compressed if the estimated execution time is an improvement over the baseline workload execution time.

\* \* \* \* \*